United States Patent
Choi et al.

(10) Patent No.: US 11,082,474 B2
(45) Date of Patent: Aug. 3, 2021

(54) DATA BUFFERING METHOD AND APPARATUS IN ADAPTIVE STREAMING SERVICE

(71) Applicant: Samsung Electronics Co., Ltd., Suwon-si (KR)

(72) Inventors: Dae-Kyu Choi, Suwon-si (KR); Do-Jun Byun, Seoul (KR); Sin-Seok Seo, Seongnam-si (KR); Hyeon-Hun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 16/082,183

(22) PCT Filed: Mar. 3, 2017

(86) PCT No.: PCT/KR2017/002344
§ 371 (c)(1),
(2) Date: Sep. 4, 2018

(87) PCT Pub. No.: WO2017/150946
PCT Pub. Date: Sep. 8, 2017

(65) Prior Publication Data
US 2020/0092346 A1 Mar. 19, 2020

(30) Foreign Application Priority Data
Mar. 4, 2016 (KR) .......... 10-2016-0026589

(51) Int. Cl.
*H04L 29/06* (2006.01)
*H04L 29/08* (2006.01)
*H04N 21/845* (2011.01)

(52) U.S. Cl.
CPC .......... *H04L 65/80* (2013.01); *H04L 65/4007* (2013.01); *H04L 65/4084* (2013.01);
(Continued)

(58) Field of Classification Search
CPC . H04L 65/80; H04L 65/4007; H04L 65/4084; H04L 67/02; H04L 67/2847; H04N 21/8456
(Continued)

(56) References Cited

U.S. PATENT DOCUMENTS 7,054,911 B1  5/2006 Lango et al.
8,812,673 B2 * 8/2014 Balachandran ......... H04L 47/10
709/226

(Continued)

FOREIGN PATENT DOCUMENTS

KR  10-2010-0107546 A  10/2010
KR  10-2014-0055019 A   5/2014
(Continued)

OTHER PUBLICATIONS

ISA/KR, International Search Report and Written Opinion of the International Searching Authority for International Application No. PCT/KR2017/002344, dated Jun. 1, 2017, 10 pages.
(Continued)

*Primary Examiner* — Hamza N Algibhah
*Assistant Examiner* — John Fan

(57) ABSTRACT

A method for buffering data in an adaptive streaming service according to an embodiment of the present disclosure comprises the steps of: measuring a per-session throughput and an available bandwidth with respect to traffic generated from a streaming application; determining a number of multiple sessions based on the per-session throughput and the available bandwidth; determining a buffer size for pre-storing data based on a cache hit ratio of the streaming application; and generating at least one request message requesting data based on the number of multiple sessions and the buffer size, and transmitting the at least one request message to a server.

10 Claims, 6 Drawing Sheets

(52) U.S. Cl.
 CPC .......... *H04L 67/02* (2013.01); *H04L 67/2847* (2013.01); *H04N 21/8456* (2013.01)

(58) Field of Classification Search
 USPC .......................................................... 709/231
 See application file for complete search history.

(56) References Cited

U.S. PATENT DOCUMENTS

| | | | | |
|---|---|---|---|---|
| 2003/0196040 | A1* | 10/2003 | Hosogi | ............... G06F 12/0833 |
| | | | | 711/128 |
| 2004/0205298 | A1 | 10/2004 | Bearden et al. | |
| 2005/0005020 | A1* | 1/2005 | Rey | ....................... H04L 1/0002 |
| | | | | 709/231 |
| 2007/0067480 | A1* | 3/2007 | Beek | ................. H04L 29/06027 |
| | | | | 709/231 |
| 2008/0274747 | A1* | 11/2008 | Ludwig | ................ H04W 28/12 |
| | | | | 455/450 |
| 2009/0292819 | A1 | 11/2009 | Kandekar et al. | |
| 2015/0113389 | A1 | 4/2015 | Kim et al. | |
| 2015/0199138 | A1* | 7/2015 | Ramachandran | ... G06F 12/0246 |
| | | | | 711/103 |
| 2015/0271072 | A1 | 9/2015 | Moreman et al. | |

FOREIGN PATENT DOCUMENTS

| | | |
|---|---|---|
| KR | 10-2015-0045317 A | 4/2015 |
| KR | 10-1524472 B1 | 6/2015 |

OTHER PUBLICATIONS

Supplementary European Search Report dated Nov. 26, 2018 in connection with European Patent Application No. 17 76 0350, 9 pages.

* cited by examiner

| N/W State | Initial Delay | Resolution | Seek Delay |
|---|---|---|---|
| Good | Same | Same | 10% Improvement |
| Medium | 15% Improvement | Same | 20% Improvement |
| Poor | 30% Improvement | 1-Level Improvement | 40% Improvement |

N/W Good : 10 Mbps, 0 ms Jitter, 0 ms add delay, 0% Loss
N/W Medium : 10 Mbps, 0 ms Jitter, 0 ms add delay, 1.0% Loss
N/W Poor : 10 Mbps, 50 ms Jitter, 50 ms Add delay, 1.0% Loss

FIG.7

DATA BUFFERING METHOD AND APPARATUS IN ADAPTIVE STREAMING SERVICE

CROSS REFERENCE TO RELATED APPLICATIONS

This application is a U.S. National Stage application under 35 U.S.C. § 371 of an International application filed on Mar. 3, 2017 and assigned application number PCT/KR2017/002344, which claimed the benefit of a Korean patent application filed on Mar. 4, 2016 in the Korean Intellectual Property Office and assigned Serial number 10-20116-0026589, the disclosures of which are incorporated herein by reference in their entireties.

BACKGROUND

Field

The present disclosure generally relates to an adaptive streaming service, and more particularly, to a method and apparatus for buffering data on the basis of multiple sessions in an adaptive streaming service.

2. Description of Related Art

In a streaming service which can be used as a video-on-demand (VOD) service or an audio-on-demand (AOD) service, a terminal that provides the service reproduces a video or audio file in real time, while downloading the video or audio file from a servicer, rather than the terminal downloading the video or audio file from the server and then reproducing the video or audio file. Accordingly, even before receiving the file completely, the terminal starts to represent data by means of a browser or a plug-in of the terminal. Consequently, the streaming service advances the starting time of reproduction and scarcely affects the capacity of a hard disk driver, which is advantageous for the user, while also facilitating billing and minimizing illegal duplication of content, which is advantageous for the business operator.

Along with the introduction of wired/wireless broadband communications which offer high transmission rates, such as asymmetrical digital subscriber line (ADSL), very high-data rate digital subscriber line (VDSL), power line communication (PLC), optical communication, and $2.5^{th}$ generation (2.5G) to $3^{rd}$ generation (3G) mobile communications, streaming services have proliferated. This is because in order to enable the streaming service, a data-transmitting server and a data-receiving terminal should be able to transmit and receive a large amount of multimedia data continuously, and be able to provide the data to an application which reproduces data as video or audio.

However, as multimedia data including video or audio has been developed toward high resolution and high quality, the amount of data has gradually been increasing, and the transmission rate is variable in many cases according to a user environment, such as the use time zone in which accessing users are concentrated, in view of the nature of Internet communication lines. That is, video or audio reproduction is often interrupted due to irregular data transmission rates. For example, on the assumption of content which is reproduced only when about, for example, 16 Kb of data is introduced per second, if a communication line supports a transmission rate of 15 kbps to 18 kbps, interruptions may occur during reproduction. Buffering is a technique for reducing the interruptions. For example, if data to be reproduced for 10 seconds is pre-stored in a buffer at the beginning of the streaming service, and then the pre-stored data is reproduced, even though the amount of introduced data is less than the amount of reproduced data at a specific time point, the presence of the data buffered for 10 seconds may remarkably reduce interruptions.

As described above, since the network state of a wireless network is unstable, compared to a legacy wired network, if a terminal provides the streaming service, the buffering technique of pre-storing, a predetermined amount of data is very important. Therefore, there is a need for a method to receive data by effectively supporting a buffering technique in order to provide a streaming service adaptively, according to the network state of a wireless network.

The above information is presented as background information only to assist with an understanding of the present disclosure. No determination has been made, as to whether any of the above might be applicable as prior art with regard to the present disclosure.

SUMMARY

An embodiment of the present disclosure provides a method and apparatus for determining a buffering scheme and a buffer size for data buffering in an adaptive streaming service.

Another embodiment of the present disclosure provides a method and apparatus for determining multiple sessions to receive data on the basis of a buffering scheme, buffer size, and network bandwidth in an adaptive streaming service.

Another embodiment of the present disclosure provides a method and apparatus for buffering data on the basis of multiple sessions in an adaptive streaming service.

In accordance with an embodiment of the present disclosure, a method of buffering data in an adaptive streaming service includes measuring a per-session throughput and available bandwidth with respect to traffic generated from a streaming application, determining the number of multiple sessions on the basis of the per-session throughput and the available bandwidth, determining buffer size for pre-storing data on the basis of the cache hit ratio of the streaming application, generating at least one request message to request data on the basis of the number of multiple sessions and the buffer size, and transmitting the generated at least one request message to a server.

In accordance with an embodiment of the present disclosure, an apparatus for buffering data in an adaptive streaming service includes a controller configured to measure a per-session throughput and available bandwidth with respect to traffic generated from a streaming application, to determine the number of multiple sessions on the basis of the per-session throughput and available bandwidth, to determine the buffer size for pre-storing data on the basis of a cache hit ratio of the streaming application, and to generate at least one request message to request data on the basis of the number of multiple sessions and the buffer size, and a transceiver configured to transmit the generated at least one request message to a server.

Other aspects, benefits, and core features of the present disclosure will be apparent to those skilled in the art from the following detailed description of preferred embodiments of the present disclosure, taken in conjunction with the attached drawings.

Before the following detailed description of the present disclosure is processed, it may be effective to define specific terms and phrases used in the present disclosure: the terms "include", "comprise", and their derivatives mean limitless inclusion; the term "or" is comprehensive and means "and/or"; the phrases "associated with", "associated therewith", and their derivatives mean include, be included with, interconnect with, contain, be contained within, connected to or with, couple to or with, be communicable with, cooperate with, interleave, juxtapose, be proximate to, be bound to or with, have, have a property of, and so on; the term "controller" means any device, system, or a part thereof for controlling at least one operation, such a device being implementable in hardware firmware, software, or a combination of at least two of hardware, firmware, and software. It is to be noted that functionalities related to a specific controller may be concentrated or distributed, and local or remote. The definitions of the specific terms and phrases are provided throughput the present disclosure. Those skilled in the art should understand that in many cases, although not in most cases, the above definitions are applied to the future use of the defined terms and phrases as well as the conventional use thereof.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a view illustrating the result of buffering data according to an embodiment of the present disclosure.

It is to be noted that similar reference numerals are used to denote the same or similar elements, features, and structures throughout the drawings.

DETAILED DESCRIPTION OF THE DISCLOSURE

Figure 1:
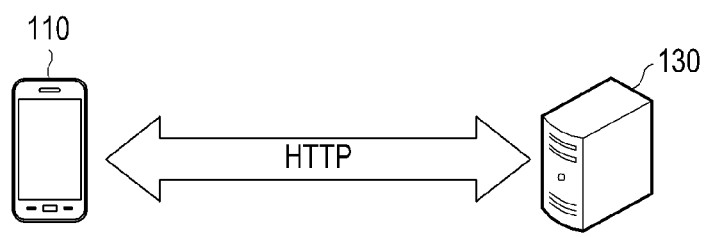
FIG. 1 is a simplified view illustrating an exemplary streaming system that provides an adaptive streaming service according to an embodiment of the present disclosure.

The following detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and the claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" covers one or more of component expressions.

Ordinal terms such as first or second may be used to describe, not limiting, various components. These expressions are used to distinguish one component from another component. For example, a first component may be referred to as a second component, and vice versa without departing from the scope of the present disclosure. The term and/or includes one or a combination of two or more of a plurality of enumerated items.

The terms as used in the present disclosure are provided to merely describe specific embodiments, not intended to limit the scope of the disclosure. It is to be understood that singular forms include plural referents unless the context clearly dictates otherwise. In the present disclosure, the term "include" or "have" signifies the presence of a feature, number, step, operation, component, part, or a combination thereof described in the disclosure, not excluding the presence of one or more other features, numbers, steps, operations, components, parts, or a combination thereof.

Unless otherwise defined, the terms and words including technical or scientific terms used herein may have the same meanings as generally understood by those skilled in the art. The teems as generally defined in dictionaries may be interpreted as having the same or similar meanings as or to contextual meanings of related technology.

Embodiments of the present disclosure relate to a method and apparatus for effectively buffering data in an adaptive streaming service. Particularly, the number of multiple sessions is determined on the basis of a throughput processed in one session and available bandwidth, with no modification made to a commercial streaming application, and buffer size is determined on the basis of the amount of data requested by the streaming application, in the embodiments of the present disclosure. Further, an embodiment of the present disclosure relates to a method of requesting and receiving data on the basis of the number of multiple sessions and the buffer size. Therefore, since data may e received as fast as possible by using the number of multiple sessions, the quality of experience (QoE) of a user may be improved, and a basic structure between a commercial streaming application and a server may be applied to a terminal without any modification made to the basic structure in the embodiment of the present disclosure. The QoE of the user includes the reduction of initial buffering time (a time period spanning from user selection of a corresponding VOD service to the beginning of reproduction), an increase in resolution (fast data reception in a network, transmission of data from the network to a streaming player, and maintaining high video quality), buffering prevention (appropriate pre-securing of data by pre-fetch), and so on.

For this purpose, a detailed description will be given below of a method and apparatus for buffering data in an adaptive streaming service according to an embodiment of the present disclosure.

FIG. 1 is a simplified view illustrating an exemplary streaming system that provides an adaptive streaming service according to an embodiment of the present disclosure.

Referring to FIG. 1, the streaming system includes a terminal 110 that executes a streaming application, and a streaming server 130 that transmits data to the to urinal 110.

The terminal 110, which is capable of wireless communication, such as a smartphone, may execute the streaming application. The streaming application provides a streaming service such as a VOD service or an AOD service to a user. For example, the streaming application may be Netflix, Hulu, or Amazon Player. The terminal 110 may redirect traffic requested by the streaming application to an internal proxy program, and determine parameters for data buffering by the proxy program. Particularly, the terminal 110 may identify a traffic request from the streaming application, measure a network state, and determine the number of multiple sessions and the optimum pre-fetch size from the measured network state. A method of determining parameters for data buffering in the terminal 110, according to an embodiment of the present disclosure, will be described below in detail with reference to FIGS. 2, 3 and 4.

The terminal 110 requests data to the streaming server 130 on the basis of the parameters determined for data buffering. Herein, the terminal 110 may request data to the streaming server 130 by hyper text transfer protocol (HTTP). The terminal 110 may receive the data by HTTP, which the streaming server 130 transmits in response to the data request. HTTP used between the terminal 110 and the streaming server 130 is an exemplary protocol, and it is apparent that any other protocol is also applicable according to the type of application and the type of transmitted and received data in an embodiment of the disclosure.

Figure 2:
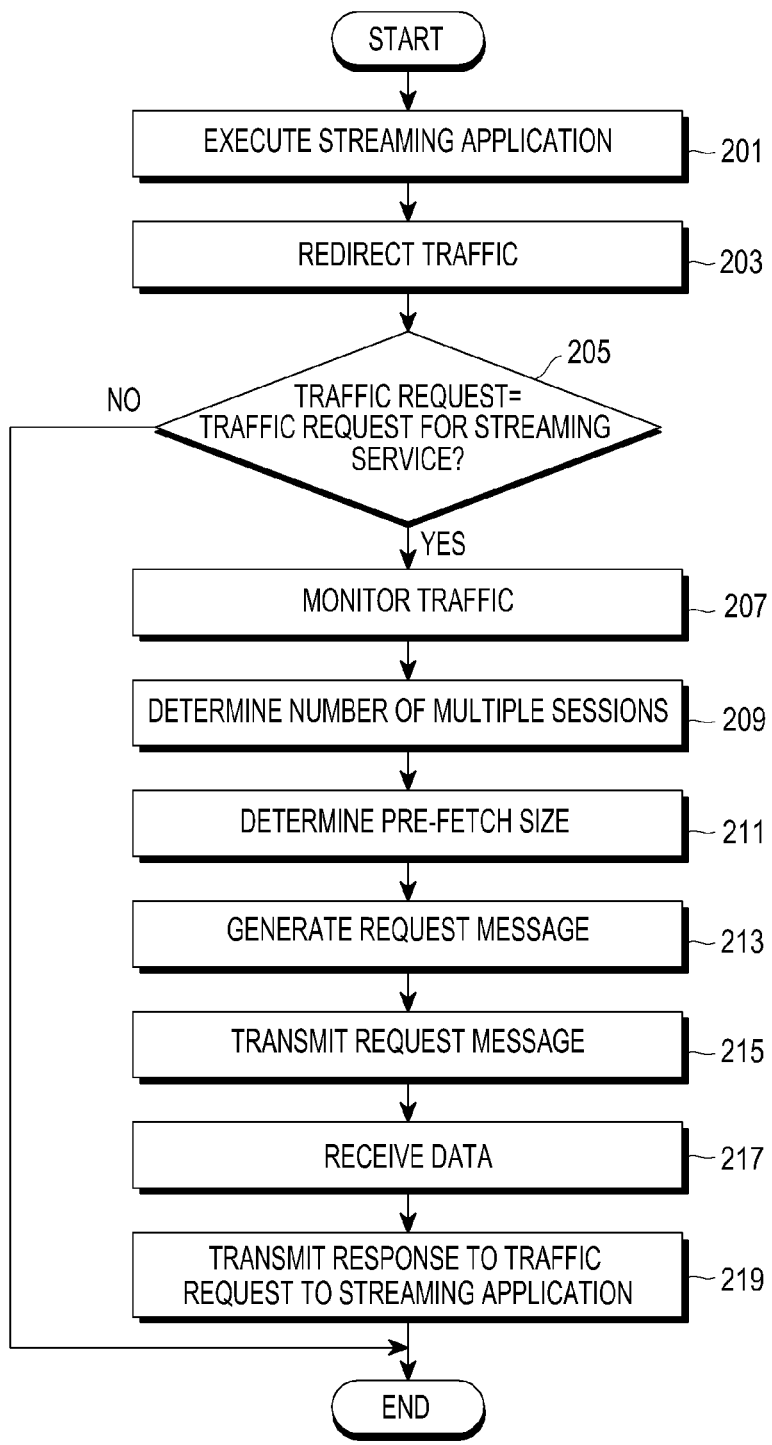
FIG. 2 is a view illustrating a method of buffering data by a terminal in order to provide an adaptive streaming service according to an embodiment of the present disclosure.
Figure 3:
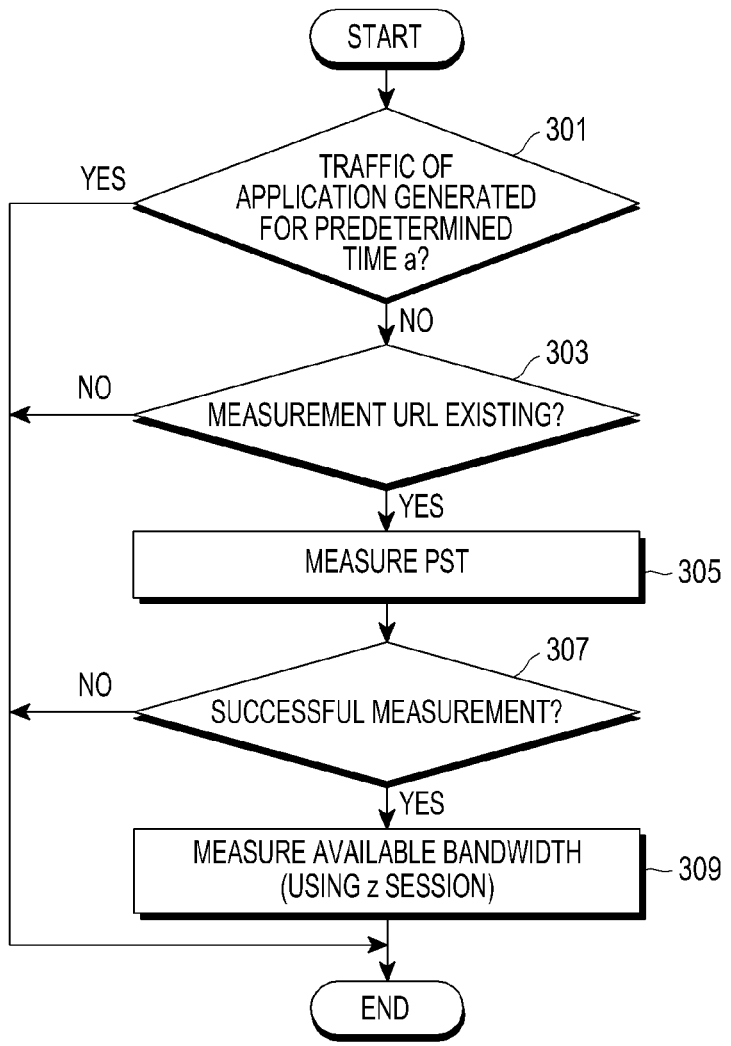
FIG. 3 is a view illustrating an exemplary method of monitoring traffic by a terminal during initial execution of a streaming application according to an embodiment of the present disclosure.
Figure 4:
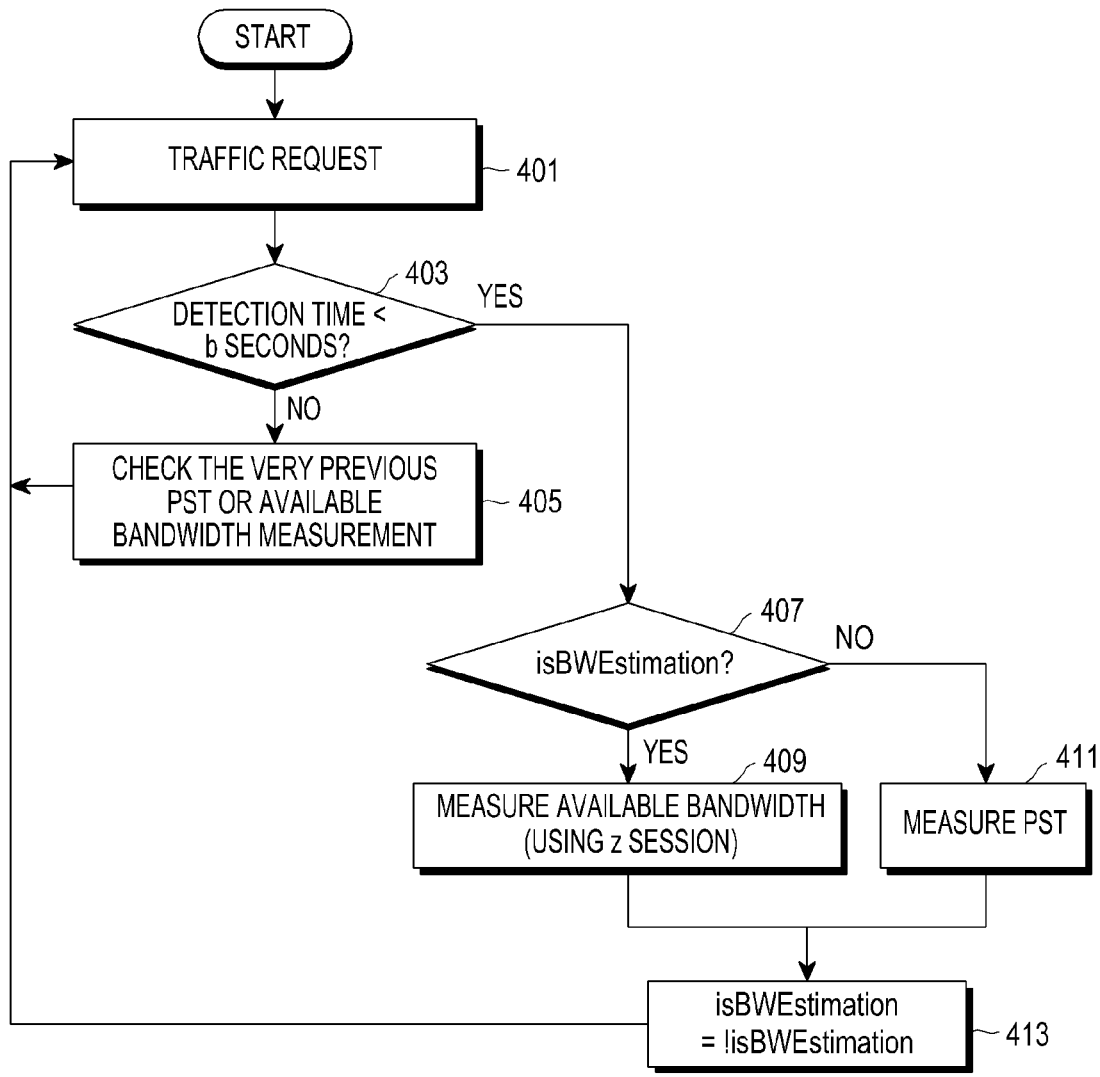
FIG. 4 a view illustrating an exemplary method of monitoring traffic by a terminal during running of a streaming application according to an embodiment of the present disclosure.

An exemplary streaming system that provides an adaptive streaming service, according to an embodiment of the present disclosure, has briefly been described above. With reference to FIGS. 2, 3 and 4, a method of buffering data at a terminal to provide an adaptive streaming service will be described below.

FIG. 2 illustrates a method of buffering data by a terminal to provide an adaptive streaming service according to an embodiment of the present disclosure.

Referring to FIG. 2, upon receipt of an event related to the execution of a specific streaming application from a user, the terminal 110 executes the specific streaming application in operation 201. If the terminal 110 executes the specific streaming application, the specific streaming application allocates an ID for the specific streaming application to the terminal 110. Then, the terminal 110 internally redirects traffic generated with the allocated ID to a proxy program, on the basis of the allocated ID in operation 203. For the redirection, a daemon exists, and the daemon sets an "iptables" command to transmit traffic generated by the specific streaming application.

Upon receiving internal traffic from the proxy program, the terminal 110 identifies whether the received traffic requests traffic for the streaming service in operation 205. That is, the terminal 110 identifies whether the received traffic requests traffic for an audio service or a video service. If the received traffic requests traffic for the streaming service, the terminal 110 performs traffic monitoring in operation 207. Meanwhile, if the received traffic requests traffic other than traffic for the streaming service, the terminal 110 bypasses the subsequent operations.

The traffic monitoring performed when the traffic received at the terminal 110 requests traffic for the streaming service may be performed in different manners during initial execution of the streaming application and while running the streaming application. A method of performing traffic monitoring by the terminal 110 during initial execution of the streaming application will be described with reference to FIG. 3, and a method of performing traffic monitoring by the terminal 110 while running the streaming application will be described with reference to FIG. 4.

FIG. 3 is a view illustrating an exemplary method of monitoring traffic by a terminal during initial execution of a streaming application according to an embodiment of the present disclosure.

Referring to FIG. 3, the terminal 110 monitors whether traffic has been generated from the streaming application itself until a predetermined time a elapses in operation 301.

Upon the generation of traffic in the streaming application before expiration of the predetermined time a, the terminal 110 ends the monitoring process for requested traffic, and processes the traffic generated from the streaming application by using one session. The reason for processing traffic generated from the streaming application at the terminal 110 is to prevent the initial measurement from obstructing traffic of the streaming application itself, thus decreasing the usability of the application for the user.

Meanwhile, if traffic has not been generated from the streaming application within the predetermined time a, the terminal 110 identifies whether there is a measurement uniform resource locator (URL) for resources to be measured in operation 303. The measurement URL is a value stored during a previous normal operation of the application. If the application has not been executed previously, the measurement URL does not exist. Therefore, the terminal 110 ends the monitoring process and downloads data by using one session. In the presence of the measurement URL, the terminal 110 measures a per-session throughput (PST) for the measurement URL in operation 305.

The terminal 110 identifies whether the PSI measurement is successful in operation 307. If the terminal 110 fails in the PSI measurement (e.g., if the measurement URL is not valid any longer), the terminal 110 will also fail in measuring available bandwidth, and thus ends the procedure, without the available bandwidth measurement. On the contrary, if the terminal 110 succeeds in the PST measurement, the terminal 110 measures the available bandwidth in operation 309. The terminal 110 downloads content on the basis of a plurality of sessions, and measures the available bandwidth of the network. The number of sessions to be used for content download at the terminal 110 may depend on the result of the PSI measurement and the type of the connected network. The download rate of content in the plurality of sessions increases, starting from 0, and reaches the available bandwidth at a specific time point, and then no longer increases. Therefore, the available bandwidth may be set as a download rate of content, which converges to a specific value and thus does not change much. In this scheme, however, too much time may be taken for a download rate to converge to a specific value, and implementation is complex. Thus, the highest download rate after expiration of a specific time from the start of a download may be set as the available bandwidth. Upon completing the available bandwidth measurement, the terminal 110 may end the content download, or continue the download until the predetermined content is completely downloaded.

FIG. 4 is a view illustrating an exemplary method of monitoring traffic by a terminal while running a streaming application according to an embodiment of the present disclosure.

Referring to FIG. 4, the terminal 110 detects a traffic request generated from the application in operation 401. The terminal 110 determines whether a predetermined time b has elapsed from the time of performing the previous PST or available bandwidth measurement in operation 403. If the predetermined time b has not elapsed from the time of performing the previous PST or available bandwidth measurement, the terminal 110 identifies the result of the previous PST or available bandwidth measurement.

Meanwhile, if the predetermined time b has elapsed from the time of performing the previous PST or available bandwidth measurement, at the time of detecting the traffic request, the terminal 110 measures a PST or available bandwidth. Specifically, if the predetermined time b has elapsed from the time of performing the previous PST or available bandwidth measurement, at the time of detecting the traffic request, the terminal 110 determines whether to perform a PST measurement or available bandwidth measurement, from an isBWEstimation parameter which may have only a value True or False. For example, the terminal 110 may determine whether the isBWEstimation parameter is True in operation 407. If the isBWEstimation parameter is True, the terminal 110 may measure available bandwidth in operation 409, and if the isBWEstimation parameter is False, the terminal 110 may measure a PST in operation 411. Upon completing the available bandwidth measurement or the PST measurement, the terminal 110 sets the value of the isBWEstimation parameter to the opposite value (i.e., !BWEstimation) in operation 413. As such, each time the PST measurement or the available bandwidth measurement is performed, the isBWEstimation parameter is switched to the opposite value. Thus, the PSI measurement and the available bandwidth measurement take place alternately. The traffic monitoring process described with reference to FIG. 4 is repeated until the specific streaming application ends.

With reference to FIGS. 3 and 4, the traffic monitoring operation 207 of the data buffering process illustrated in FIG. 2 has been described. Now, a description will be given of operations subsequent to the traffic monitoring operation 207 performed by the terminal, with reference made again to FIG. 2.

Referring to FIG. 2 again, it is important for the terminal 110 to maintain an appropriate number of multiple sessions in order to prevent congestion. To this end, the terminal 110 may set the number of multiple sessions by dividing the available bandwidth by the PST according to <Equation 1>, the available bandwidth and the PST being measured in the manner described with reference to FIG. 3 or FIG. 4, in operation 209.

Session=available bandwidth/PST  <Equation 1>

Since the PST is a maximum rate that one session may achieve, the maximum number of multiple sessions which do not reach the available bandwidth may be calculated by dividing the available bandwidth by the PST.

Then, the terminal 110 determines the pre-fetch size for data to be received from the streaming server 130 in operation 211. In a data buffering technique, the QoE of a user is generally determined according to the amount of data that the terminal 110 receives and stores in the beginning, with respect to a data request of the terminal 110. For example, if the terminal 110 receives too small an amount of data, buffering may occur in the streaming application, whereas if the terminal 110 receives too much data, the whole network is used inefficiently, thereby causing resource waste in the network and storage.

Accordingly, the terminal 110 determines the pre-fetch size on the basis of a cache hit ratio of the steaming application if the streaming application is initially executed, the terminal 110 performs pre-fetch in a fixed size. After receiving data in the fixed size set for the initial execution of the application, the terminal 110 determines the pre-fetch size on the basis of the cache hit ratio according to a request of the streaming application. In the cache hit ratio, cache hit refers to the transmission of pre-fetched data from the terminal 110 according to the request of the streaming application, and cache hit failure refers to discarding pre-fetched data at the terminal 110 because the streaming application does not request data. Meanwhile, since resolution varies with network situations in an adaptive streaming scheme, pre-fetched data may be discarded in some cases.

The terminal 110 determines the pre-fetch size on the basis of the property of a cache hit ratio. That is, if the cache hit ratio increases, this implies that the streaming application continuously takes pre-fetched data from the terminal 110. Thus, if the cache hit ratio increases, the terminal 110 increases the pre-fetch size, determining that a predicted resolution matches a desired resolution of the streaming application and thus the streaming application operates normally. If the cache hit ratio decreases, the terminal 110 decreases the pre-fetch size, determining that the predicted resolution does not match the desired resolution of the streaming application, and thus the amount of discarded data increases. Therefore, the terminal 110 is capable of reducing the amount of discarded data by decreasing the pre-fetch size and thus increases the cache hit ratio, thereby efficiently using a current network.

Subsequently, the terminal 110 generates a request message for requesting data to the streaming server 130 on the basis of the determined number of multiple sessions and pre-fetch size in operation 213. The terminal 110 may determine a per-session pre-fetch size by dividing the determined pre-fetch size by the determined number of multiple sessions, and at the same time, may generate request messages to be transmitted to the streaming server 130. The terminal 110 transmits the generated request messages to the streaming server 130 by HTTP in operation 215. The HTTP may be generated by using an existing Android library.

For example, if the pre-fetch size is 1 MB, and the number of multiple sessions is 5, the request messages may be configured as illustrated in the following <Table 1>. That is, the terminal 110 may generate 5 HTTP request messages of the ranges illustrated in <Table 1>, and simultaneously transmit the request messages to the streaming server 130 by using 5 threads.

TABLE 1

Req1. Range: 0~209,714 bytes
Req2. Range: 209,715~419,430 bytes
Req3. Range: 419,431~629,146 bytes
Req4. Range: 629,147~838,862 bytes
Req5. Range: 838,862~1,048,576 bytes Thus, the terminal 110 may simultaneously receive data of the same size through as many segmented sessions as the determined number of multiple sessions, as a response message to the request message in operation 217. Accordingly, since the terminal 110 simultaneously receives data of the same size in N sessions by utilizing the current network as much as possible, the network may be efficiently used in the embodiment of the disclosure. The above example is a case of using HTTP, and it is to be noted that the same is applicable to any other communication scheme.

Then, after receiving the data, the terminal 110 transmits a response to the traffic request of the streaming application to the streaming application in operation 219. Accordingly, the streaming application may efficiently provide streaming data to a user by using data buffered in the terminal 110.

With reference to FIGS. 2, 3 and 4, the method of buffering data by a terminal to provide an adaptive streaming service, according to an embodiment of the present disclosure, has been described above. Now, a description will be given of the internal structure of the terminal 110 that buffers data, with reference to FIG. 5.

Figure 5:
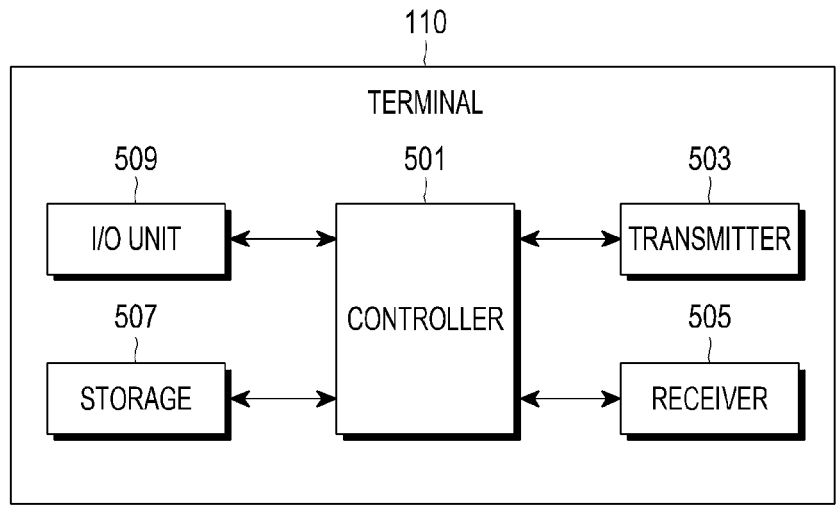
FIG. 5 is a view illustrating the internal structure of a terminal buffers data according to an embodiment of the present disclosure.

FIG. 5 is a view illustrating the internal structure of a terminal that buffers data according to an embodiment of the present disclosure.

Referring to FIG. 5, the terminal 110 includes a controller 501, a transmitter 503, a receiver 505, storage 507, and an input/output (I/O) unit 509.

The controller 501 provides overall control to the terminal 110, Particularly, the controller 501 controls operations related to data buffering in an adaptive streaming service according to an embodiment of the disclosure. The operations related to data buffering in the adaptive streaming service, according to the embodiment of the disclosure, have been described with reference to FIGS. 2, 3 and 4, and thus will not be described herein.

The transmitter 503 receives various signals and messages from other entities included in a streaming system under the control of the controller 501. Various signals and messages received by the transmitter 503 have been described with reference to FIGS. 2, 3 and 4, and thus will not be described herein.

Further, the receiver 505 receives various signals and messages from other entities included in a streaming system under the control of the controller 501. Various signals and messages received by the receiver 504 have been described with reference to FIGS. 2, 3 and 4, and thus will not be described herein.

The storage 507 stores a program and various data under the control of the controller 501, which are related to the operations related to data buffering performed by the terminal 110 in the adaptive streaming service according to the embodiment of the present disclosure.

The I/O unit 509 inputs and outputs various signals and various messages which are related to the operations related to data buffering performed by the terminal 110 in the adaptive streaming service according to the embodiment of the present disclosure.

Meanwhile, while the terminal 110 is shown in FIG. 5 as configured to include separate units such as the controller 501, the transmitter 503, the receiver 505, the storage 507, and the I/O unit 509, it is obvious that the terminal 110 may be configured such that at least two of the controller 501, the transmitter 503, the receiver 505, the storage 507, and the I/O unit 509 are integrated. Further, the terminal 110 may be implemented as one processor.

As described above, if the method of buffering data by a terminal, according to an embodiment of the present disclosure, is used, available network resources can be used efficiently.

To be specific, conventionally, a terminal transmits a probe packet to a server at every predetermined interval, and estimates available bandwidth with respect to a time point at which a property of the probe packet is changed. Moreover, the conventionally measured available bandwidth is available bandwidth between the terminal and the server, used for the available bandwidth measurement, not available bandwidth between a client and an application server with which an application installed in the terminal actually communicates directly. Compared to the conventional technology, a PST and available bandwidth may be measured on the basis of traffic specific to a streaming application in an embodiment of the disclosure. Since the number of multiple sessions may be calculated by using the PST and the available bandwidth (available bandwidth/PST), network resources can be used as much as possible, as illustrated in FIG. 6.

Figure 6:
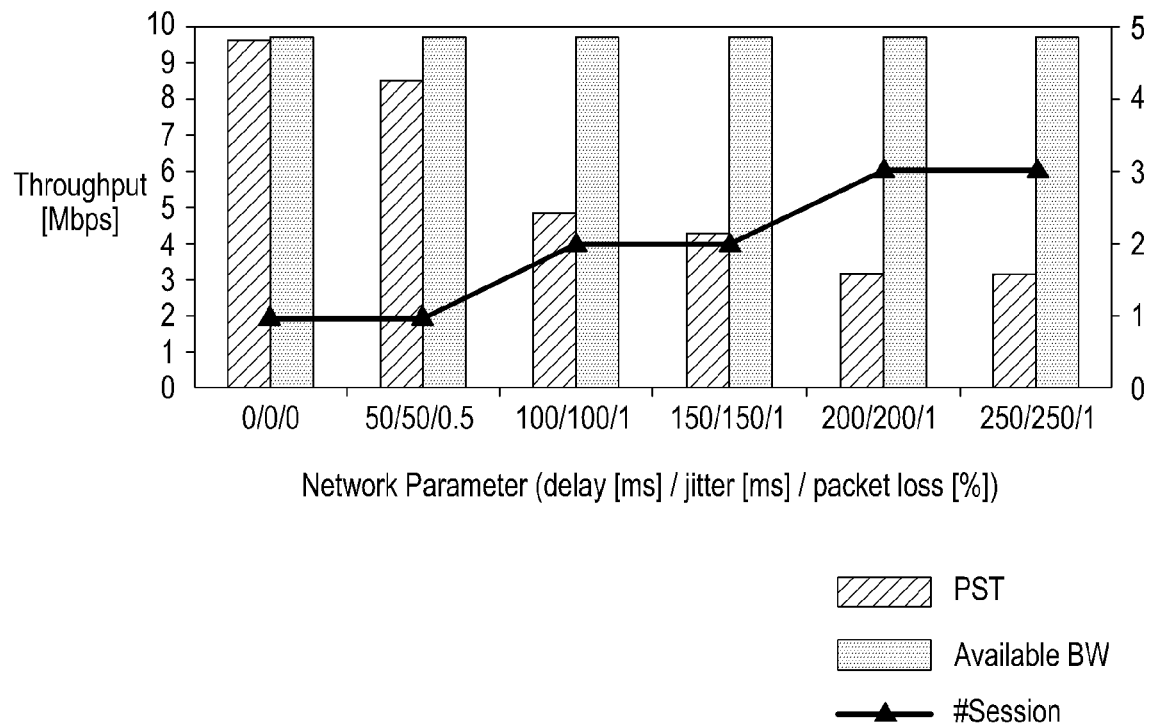
FIG. 6 is a view illustrating exemplary utilization of an available bandwidth according to an embodiment of the present disclosure.

FIG. 6 is a view illustrating exemplary utilization of available bandwidth according to an embodiment of the present disclosure.

Referring to FIG. 6, if the result of a test in a 10-Mbps environment indicates a good network environment, that is, if a delay, a jitter, and packet loss are low, a PST may sufficiently utilize available bandwidth, whereas if the network environment is poor, the PST does not sufficiently utilize the available bandwidth. It may be noted that the increase of the number of multiple sessions from 2 to 3 leads to sufficient use of the available bandwidth in this environment.

If the method of buffering data at a terminal, according to the embodiment of the present disclosure, is applied, data can be received efficiently over a network without modifying the configurations and operations of a streaming application and a streaming server. That is, to increase data reception performance in the conventional technology, it is necessary to modify the configuration and operation of a streaming application and/or a streaming server. Further, since it is impossible to modify the configurations and operations of a streaming application and a streaming server in a commercial system, the conventional data buffering method is not viable. In contrast, the embodiment of the present disclosure proposes a method of buffering data at a terminal without modifying the configurations and operations of a streaming application and a streaming server, thus making it possible to still utilize the configurations and operations of a streaming application and a streaming server used in a commercial system.

Further, if the method of buffering data at a terminal according to the embodiment of the present disclosure is applied, the pre-fetch size can be determined effectively.

To be specific, data is received in advance by using a fixed pre-fetch size in the conventional technology. This conventional scheme is effective at a constant bit rate, that is, in receiving as much data as the fixed size irrespective of a network situation. However, the size of data to be received varies according to the network state in an adaptive streaming service, and thus the scheme of receiving data of a fixed size is not efficient. Compared to the conventional scheme, the amount of necessary data is calculated preliminarily on the basis of HTTP adaptive streaming (HAS), and the data is pre-fetched in the embodiment of the present disclosure. The pre-fetch size is an important factor in terms of the QoE of a user and efficient resource use, and the optimum pre-fetch size is determined on the basis of parameters determined in an initial stage in the embodiment of the present disclosure. Therefore, both aspects of the QoE of a user and efficient resource use may be satisfied.

In addition, if the method of buffering data at a terminal, according to the embodiment of the present disclosure, is applied, the performance of data streaming can be improved. That is, pre-fetch may be performed on the basis of multiple sessions in the embodiment of the present disclosure. Therefore, compared to the conventional method of receiving data using one session, desired data can be received preliminarily by efficiently using a network in the embodiment of the present disclosure. For example, it may be noted that if the embodiment of the present disclosure is applied to a commercial player and server, a network state is measured as illustrated in FIG. 7.

While the disclosure has been shown id described with reference to certain exemplary embodiments thereof, it will be understood by those skilled in the art that various changes in form and details may be made therein without departing from the spirit and scope of the disclosure.

The invention claimed is:

1. A method of buffering data in an adaptive streaming service, the method comprising:
   measuring, by a mobile terminal, a per-session throughput and an available bandwidth with respect to traffic generated from a streaming application;
   determining, by the mobile terminal, a number of multiple sessions based on the per-session throughput and the available bandwidth;
   determining, by the mobile terminal, a total buffer size for pre-storing data, wherein, during an initial execution of the streaming application, the total buffer size is determined based a fixed buffer size, and after the initial execution of the streaming application, the total buffer size is determined based on a cache hit ratio of the streaming application, the cache hit ratio including a rate determined by successful transmission of pre-fetched data from a buffer to the streaming application according to requests from the streaming application;
   determining, by the mobile terminal, a per-session buffer size by dividing the total buffer size by the number of the multiple sessions;
   generating, by the mobile terminal, request messages for requesting data based on the per-session buffer size;
   transmitting, by the mobile terminal, the request messages through the multiple sessions, wherein a number of the request messages is equal to the number of the multiple sessions; and
   receiving, by the mobile terminal, response messages in response to the request messages through the multiple sessions, wherein the response messages comprise data of a same size.

2. The method of claim 1, wherein the available bandwidth is measured based on a predetermined number of sessions.

3. The method of claim 2, wherein the number of the multiple sessions is determined by a value obtained by dividing the available bandwidth by the per-session throughput.

4. The method of claim 1, wherein if the cache hit ratio of the streaming application increases, the total buffer size is determined to be larger than the fixed buffer size, and if the cache hit ratio of the streaming application decreases, the total buffer size is determined to be less than the fixed buffer size.

5. The method of claim 1, wherein the request messages are transmitted to a server by using hyper text transfer protocol (HTTP).

6. A mobile terminal for buffering data in an adaptive streaming service, the mobile terminal comprising:
   a transceiver; and
   a controller coupled with the transceiver and configured to:
      measure a per-session throughput and an available bandwidth with respect to traffic generated from a streaming application,
      determine a number of multiple sessions based on the per-session throughput and the available bandwidth,
      determine a total buffer size for pre-storing data, wherein, during an initial execution of the streaming application, the total buffer size is determined based a fixed buffer size, and after the initial execution of the streaming application, the total buffer size is determined based on a cache hit ratio of the streaming application, the cache hit ratio including a rate determined by successful transmission of pre-fetched data from a buffer to the streaming application according to requests from the streaming application,
      determine a per-session buffer size by dividing the total buffer size by the number of the multiple sessions,
      generate request messages for requesting data based on the per-session buffer size,
      transmit the request messages through the multiple sessions, wherein a number of the request messages is equal to the number of the multiple sessions, and
      receive response messages in response to the request messages through the multiple sessions, wherein the response messages comprise data of a same size.

7. The mobile terminal of claim 6, wherein the available bandwidth is measured based on a predetermined number of sessions.

8. The mobile terminal of claim 7, wherein the number of the multiple sessions is determined by a value obtained by dividing the available bandwidth by the per-session throughput.

9. The mobile terminal of claim 6, wherein if the cache hit ratio of the streaming application increases, the total buffer size is determined to be larger than the fixed buffer size, and if the cache hit ratio of the streaming application decreases, the total buffer size is determined to be less than the fixed buffer size.

10. The mobile terminal of claim 6, wherein the request messages are transmitted to a server by using hyper text transfer protocol (HTTP).

* * * * *